(12) United States Patent
Lu et al.

(10) Patent No.: US 8,156,086 B2
(45) Date of Patent: *Apr. 10, 2012

(54) SYSTEMS AND METHODS FOR STORED DATA VERIFICATION

(75) Inventors: Jun Lu, Ocean, NJ (US); Arun Amarendran, Bangalore (IN)

(73) Assignee: CommVault Systems, Inc., Oceanport, NJ (US)

( * ) Notice: Subject to any disclaimer, the term of this patent is extended or adjusted under 35 U.S.C. 154(b) by 371 days.

This patent is subject to a terminal disclaimer.

(21) Appl. No.: 12/248,779

(22) Filed: Oct. 9, 2008

(65) Prior Publication Data

US 2009/0043830 A1  Feb. 12, 2009

Related U.S. Application Data

(63) Continuation of application No. 10/990,286, filed on Nov. 15, 2004, now Pat. No. 7,440,982.

(60) Provisional application No. 60/520,452, filed on Nov. 13, 2003.

(51) Int. Cl.
G06F 7/00 (2006.01)
G06F 17/00 (2006.01)

(52) U.S. Cl. ..................................... 707/690
(58) Field of Classification Search .............. 707/690, 707/999.204
See application file for complete search history.

(56) References Cited

U.S. PATENT DOCUMENTS

| | | |
|---|---|---|
| 4,296,465 A | 10/1981 | Lemak |
| 4,586,182 A | 4/1986 | Gallager |
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |

(Continued)

FOREIGN PATENT DOCUMENTS

EP     0259912     3/1988

(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner* — Aleksandr Kerzhner (74) *Attorney, Agent, or Firm* — Knobbe, Martens, Olson & Bear, LLP (57) ABSTRACT

Methods and systems are described for verifying stored data by receiving a first set of metadata associated with a first set of stored data, generating a second set of metadata associated with a second set of stored data which is associated with the first set of stored data, and comparing the first set of metadata and second set of metadata. Alternatively, the storage system can also generate a first set of metadata associated with a first set of stored data, generate a second set of stored data which is a copy of the first set of stored data, generate a second set of metadata associated with the second set of stored data, and compare the first set of metadata and the second set of metadata.

17 Claims, 8 Drawing Sheets

U.S. PATENT DOCUMENTS

| | | |
|---|---|---|
| 5,239,647 A | 8/1993 | Anglin et al. |
| 5,241,668 A | 8/1993 | Eastridge et al. |
| 5,241,670 A | 8/1993 | Eastridge et al. |
| 5,245,595 A | 9/1993 | Yasukawa |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,485,606 A | 1/1996 | Midgdey et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,574 A | 8/1996 | Grosskopf et al. |
| 5,559,957 A | 9/1996 | Balk |
| 5,559,991 A | 9/1996 | Kanfi |
| 5,592,618 A | 1/1997 | Micka et al. |
| 5,598,546 A | 1/1997 | Blomgren |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,675,511 A | 10/1997 | Prasad et al. |
| 5,682,513 A | 10/1997 | Candelaria et al. |
| 5,687,343 A | 11/1997 | Fecteau et al. |
| 5,699,361 A | 12/1997 | Ding et al. |
| 5,719,786 A | 2/1998 | Nelson et al. |
| 5,729,743 A | 3/1998 | Squibb |
| 5,737,747 A | 4/1998 | Vishlitzky et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,172 A | 6/1998 | Fox |
| 5,778,395 A | 7/1998 | Whiting et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,860,104 A | 1/1999 | Witt et al. |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,933,104 A | 8/1999 | Kimura |
| 5,950,205 A | 9/1999 | Aviani, Jr. |
| 5,956,519 A | 9/1999 | Wise et al. |
| 5,970,233 A | 10/1999 | Lie et al. |
| 5,970,255 A | 10/1999 | Tran et al. |
| 5,974,563 A | 10/1999 | Beeler, Jr. |
| 5,987,478 A | 11/1999 | See et al. |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,026,414 A | 2/2000 | Anglin |
| 6,052,735 A | 4/2000 | Ulrich et al. |
| 6,073,220 A | 6/2000 | Gunderson |
| 6,076,148 A | 6/2000 | Kedem et al. |
| 6,094,416 A | 7/2000 | Ying |
| 6,094,684 A | 7/2000 | Pallmann |
| 6,105,129 A | 8/2000 | Meier et al. |
| 6,122,668 A | 9/2000 | Teng et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,212,512 B1 | 4/2001 | Barney et al. |
| 6,237,059 B1 | 5/2001 | Dean et al. |
| 6,260,069 B1 | 7/2001 | Anglin |
| 6,269,431 B1 | 7/2001 | Dunham |
| 6,275,953 B1 | 8/2001 | Vahalia et al. |
| 6,292,783 B1 | 9/2001 | Rohler |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,353,818 B1 | 3/2002 | Carino, Jr. |
| 6,356,801 B1 | 3/2002 | Goodman et al. |
| 6,374,336 B1 | 4/2002 | Peters et al. |
| 6,381,740 B1 | 4/2002 | Miller et al. |
| 6,389,432 B1 | 5/2002 | Pothapragada et al. |
| 6,389,511 B1 * | 5/2002 | Kedem .................. 711/114 |
| 6,418,478 B1 | 7/2002 | Ignatius et al. |
| 6,421,711 B1 | 7/2002 | Blumenau et al. |
| 6,467,035 B2 | 10/2002 | Tate et al. |
| 6,484,232 B2 | 11/2002 | Olarig et al. |
| 6,487,561 B1 | 11/2002 | Ofek et al. |
| 6,487,644 B1 | 11/2002 | Huebsch et al. |
| 6,502,205 B1 | 12/2002 | Yanai et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,564,228 B1 | 5/2003 | O'Connor |
| 6,581,143 B2 | 6/2003 | Gagne et al. |
| 6,604,149 B1 | 8/2003 | Deo et al. |
| 6,654,825 B2 | 11/2003 | Clapp et al. |
| 6,658,436 B2 | 12/2003 | Oshinsy et al. |
| 6,658,526 B2 | 12/2003 | Nguyen et al. |
| 6,675,159 B1 | 1/2004 | Lin et al. |
| 6,704,755 B2 | 3/2004 | Midgley et al. |
| 6,732,124 B1 | 5/2004 | Koseki et al. |
| 6,760,723 B2 | 7/2004 | Oshinsky et al. |
| 6,871,160 B2 | 3/2005 | Jaw |
| 6,886,020 B1 | 4/2005 | Zahavi et al. |
| 7,003,641 B2 | 2/2006 | Prahlad et al. |
| 7,007,046 B2 | 2/2006 | Manley et al. |
| 7,035,880 B1 | 4/2006 | Crescenti et al. |
| 7,130,970 B2 | 10/2006 | Devassy et al. |
| 7,174,433 B2 | 2/2007 | Kottomtharayil et al. |
| 7,213,021 B2 | 5/2007 | Taguchi et al. |
| 7,246,207 B2 | 7/2007 | Kottomtharayil et al. |
| 7,272,606 B2 | 9/2007 | Borthakur et al. |
| 7,315,923 B2 | 1/2008 | Retnamma et al. |
| 7,346,623 B2 | 3/2008 | Prahlad et al. |
| 7,380,072 B2 | 5/2008 | Kottomtharayil et al. |
| 7,409,509 B2 | 8/2008 | Devassy et al. |
| 7,440,982 B2 | 10/2008 | Lu et al. |
| 7,472,238 B1 | 12/2008 | Gokhale |
| 7,484,054 B2 | 1/2009 | Kottomtharayil et al. |
| 7,490,207 B2 | 2/2009 | Amarendran |
| 7,500,053 B1 | 3/2009 | Kavuri et al. |
| 7,536,291 B1 | 5/2009 | Retnamma et al. |
| 7,546,324 B2 | 6/2009 | Prahlad et al. |
| 7,613,748 B2 | 11/2009 | Brockway et al. |
| 7,765,369 B1 | 7/2010 | Prahlad et al. |
| 7,865,470 B2 | 1/2011 | Fries et al. |
| 2002/0042869 A1 | 4/2002 | Tate et al. |
| 2003/0126107 A1 | 7/2003 | Yamagami |
| 2003/0182330 A1 * | 9/2003 | Manley et al. ............. 707/205 |
| 2004/0039912 A1 | 2/2004 | Borrowman et al. |
| 2004/0054854 A1 | 3/2004 | Thiyagaranjan et al. |
| 2004/0093325 A1 | 5/2004 | Banerjee et al. |
| 2004/0193827 A1 | 9/2004 | Mogi et al. |
| 2004/0230863 A1 | 11/2004 | Buchhorn |
| 2005/0033800 A1 | 2/2005 | Kavuri et al. |
| 2005/0050070 A1 | 3/2005 | Sheldon |
| 2005/0203910 A1 | 9/2005 | Taguchi et al. |

| | | | |
|---|---|---|---|
| 2005/0246376 | A1 | 11/2005 | Lu et al. |
| 2006/0010154 | A1 | 1/2006 | Prahlad et al. |
| 2006/0053304 | A1 | 3/2006 | Fries et al. |
| 2006/0242489 | A1 | 10/2006 | Brockway et al. |
| 2009/0043830 | A1 | 2/2009 | Lu et al. |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| WO | WO-95/13580 | 5/1995 |
| WO | WO-98/39707 | 9/1998 |
| WO | WO 98/39707 | 9/1998 |
| WO | WO-99/12098 | 3/1999 |
| WO | WO 99/14692 | 3/1999 |
| WO | WO 2005/055093 | 6/2005 |

OTHER PUBLICATIONS

Arneson, David A., Control Data Corporation, *Development of Omniserver*, Mass Storage Systems, 1990, pp. 88-93.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

Blanton, Microsoft (R) Computer Dictionary, Jan. 1, 2002, Microsoft Press, Fifth Edition, 97.

Stevens, TCP/IP Illustrated, Dec. 31, 1993, Addison Wesley Professional, vol. 1: The Protocols, Chapter 17.3 TCP Header.

International Search Report, PCT/US2004/038195, dated Feb. 15, 2005.

* cited by examiner

STORED DATA VERIFICATION TABLE — 600

| CHUNK ID (610) | CHUNK VERIFIED (620) | RESULT (630) |
|---|---|---|
| 1 | YES/NO | GOOD COPY |
| 2 | YES/NO | UNSUCCESSFUL |
| 3 | YES/NO | GOOD COPY |
| 4 | YES/NO | FILE 5 BAD |
| 5 | YES/NO | BAD INCREMENTAL BLOCK |
| 6 | YES/NO | GOOD COPY |
| 7 | YES/NO | GOOD COPY |
| 8 | YES/NO | GOOD COPY |
| 9 | YES/NO | FILE 10 BAD |
| n | YES/NO | BAD INCREMENTAL BLOCK |

SYSTEMS AND METHODS FOR STORED DATA VERIFICATION

RELATED APPLICATIONS

This application is a continuation of U.S. patent application Ser. No. 10/990,286, filed Nov. 15, 2004, which claims the benefit of U.S. Provisional patent application No. 60/520,452 titled SYSTEM AND METHOD FOR STORED DATA ARCHIVE VERIFICATION, filed Nov. 13, 2003, each of which is hereby incorporated herein by reference in its entirety.

This application is also related to the following pending applications, each of which is hereby incorporated herein by reference in its entirety:

U.S. Pat. No. 6,418,478, titled PIPELINED HIGH SPEED DATA TRANSFER MECHANISM, issued Jul. 9, 2002;

U.S. Provisional Patent Application Ser. No. 60/460,234, titled SYSTEM AND METHOD FOR PERFORMING STORAGE OPERATIONS IN A COMPUTER NETWORK, filed Apr. 3, 2003;

U.S. patent application Ser. No. 10/818,749, titled SYSTEM AND METHOD FOR DYNAMICALLY PERFORMING STORAGE OPERATIONS IN A COMPUTER NETWORK, filed Apr. 5, 2004, now U.S. Pat. No. 7,246,207, issued Jul. 17, 2007;

U.S. patent application Ser. No. 10/260,209, titled SYSTEM AND METHOD FOR ARCHIVING OBJECTS IN AN INFORMATION STORE, filed Sep. 30, 2002, now U.S. Pat. No. 7,107,298, issued Sep. 16, 2006; and U.S. patent application Ser. No. 09/495,751, titled HIGH SPEED DATA TRANSFER MECHANISM, filed Feb. 1, 2000, now U.S. Pat. No. 7,209,972, issued Apr. 24, 2007.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND

1. Field

The invention disclosed herein relates generally to data storage systems in computer networks and, more particularly, to improvements in storing and verifying accurate archiving of electronic data.

2. Description of the Related Art

Storage architectures used by individual computers or data stores to store electronic data typically include volatile storage media such as Random Access Memory "RAM", and one or more nonvolatile storage devices such as hard drives, tape drives, optical disks, and other storage devices that form a part of or are directly associated with an individual computer. A network of computers such as a Local Area Network "LAN" or a Wide Area Network "WAN", typically store electronic data via servers or stand-alone storage devices accessible via the network. Stand-alone storage devices are generally connected to one individual computer or a network of computers. Network storage devices commonly known in the art typically include physical drives in which tapes or other storage media are stored and a robotic arm which is used to place the tapes or storage media into the drives. Examples of network storage devices include networkable tape drives, optical libraries, Redundant Arrays of Inexpensive Disks "RAID", CD-ROM jukeboxes, and other devices.

Electronic data is typically archived according to a schedule, for example, data is designated to be copied and stored once a day. Generally, data is archived in the event that an original copy becomes unavailable, for example, the data is destroyed, lost or otherwise inaccessible. In general, the data is directed to a system component to be copied or backed up to storage media, such as an auxiliary copy, copy backup or quick recovery copy. Some systems check the copy or backup to ensure the copy or backup is accurate. Generally, the accuracy check includes steps such as analyzing each data item copied and comparing it to the original data, or other method. Such verification methods can be lengthy and time consuming for copies of large volumes of data, requiring significant use of system resources. Alternatively, some systems use cursory data checks, such as comparing filenames, which is less time consuming, however, it yields a less reliable data check.

SUMMARY

The present invention addresses the problems discussed above, and includes a method for verifying stored data. Methods and systems are described for verifying stored data. The system includes components such as a storage manager, media agent, storage device, jobs manager, archive check manager, index, copy manager, client computer, and data store. The storage system verifies data by receiving a first set of metadata associated with a first set of stored data, generating a second set of metadata associated with a second set of stored data, and comparing the first set of metadata and second set of metadata. Alternatively, the storage system generates a first set of metadata associated with a first set of stored data, generates a second set of stored data associated with the first set of stored data, generates a second set of metadata associated with the second set of stored data, and compares the first set of metadata and the second set of metadata.

The method involves receiving a first set of metadata associated with a first set of stored data. The first set of metadata is typically generated based on the first set of stored data, or otherwise associated with the first set of stored data. The first set of metadata is received, for example, from a local system component, or external source. The first set of metadata may also be received in response to a retrieval storage operation initiated by a system component. The method generates a second set of metadata associated with a second set of stored data. Preferably, the second set of metadata is generated according to the same procedure used to generate or create the first set of metadata. Additionally, it is preferred that the second set of stored data be data that is associated with the first set of stored data, such as a backup, auxiliary copy, or other copy. The method compares the first set of metadata and the second set of metadata. In general, a comparison of the first set of metadata and the second set of metadata can reveal that the metadata sets are the same, or different. If the comparison reveals that the first and second sets of metadata are the same, then generally, the first set of stored data and the second set of stored data are also the same, and there was an accurate copy made in the second set of stored data. If the comparison of the first and second sets of metadata reveals differences, then the first and second sets of stored data are not the same, and there may have been an error in creating the second set of stored data. In the event that inconsistencies are found between the first and second sets of metadata, the method may initiate a storage operation, such as a copy or backup the first set of stored data.

In another embodiment of the invention, the method for verifying stored data includes performing a storage operation, for example, a copy or backup operation, or other storage operation as further described herein. In performing the storage operation, a first set of metadata is generated and is associated with a first set of stored data. Preferably, the first set of metadata is generated based on the first set of stored data. The first set of stored data is preferably an original or primary copy, or other original set of data. Additionally, a second set of stored data is generated and is associated with the first set of stored data. Preferably, the second set of stored data is a backup, auxiliary copy, other copy, or otherwise based on the first set of stored data. The method generates a second set of metadata based on the second set of stored data. Preferably the second set of metadata is generated according to the same procedure as the first set of metadata. The first set of metadata and the second set of metadata are compared. The comparison of the first set of metadata and the second set of metadata provide an accuracy check for the first set of stored data and the second set of stored data.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
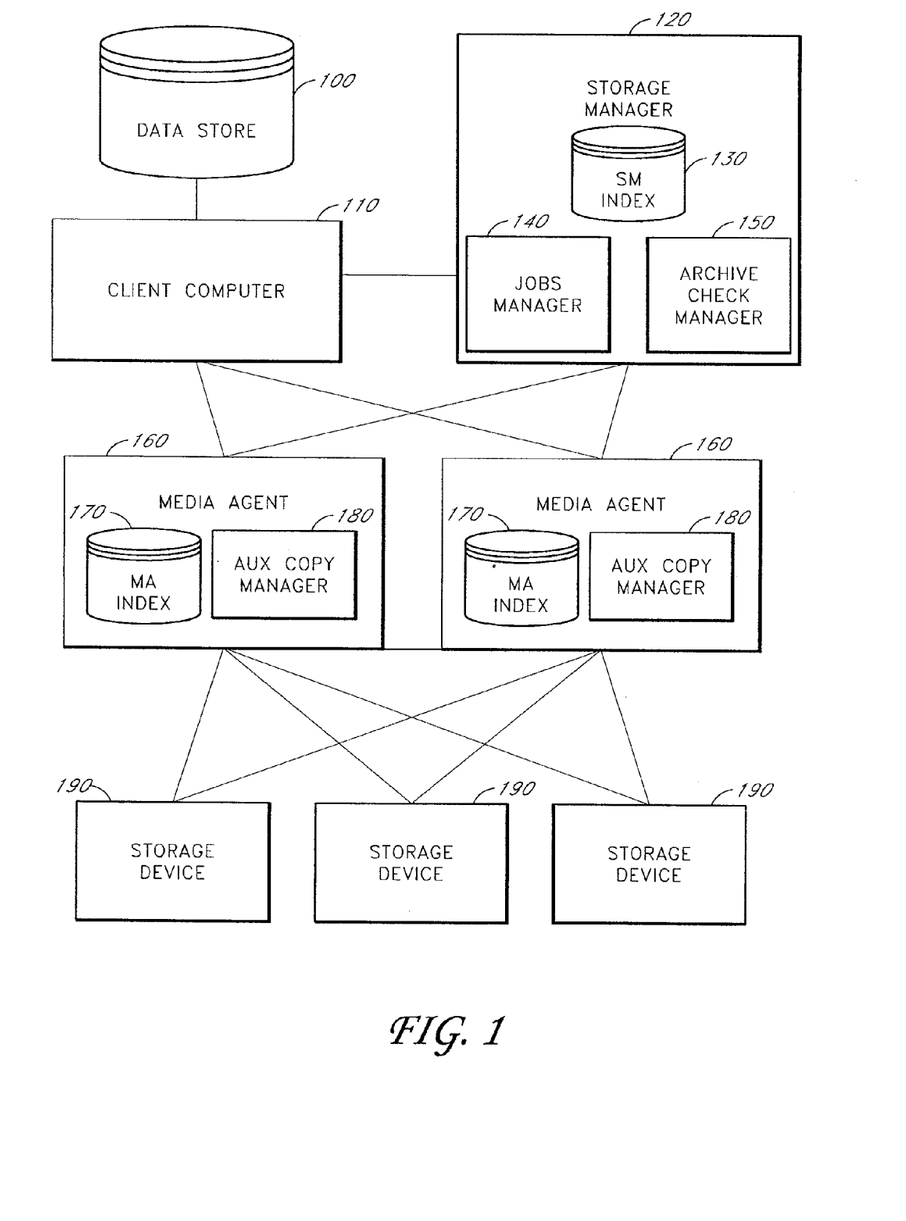
FIG. 1 is block diagram showing a high-level view of the storage network architecture and components according to an embodiment of the invention.

Preferred embodiments of the invention are now described with reference to the drawings. An embodiment of the system of the present invention is shown in FIG. 1. The system and components of the system as presented in FIG. 1 are exemplary of a modular storage system such as the COMMVAULT GALAXY backup and retrieval system and QINETIX storage management system, available from CommVault Systems, Inc. of Oceanport, N.J., and further described in U.S. Provisional Patent Application No. 60/460,234, titled SYSTEM AND METHOD FOR PERFORMING STORAGE OPERATIONS IN A COMPUTER NETWORK, filed Apr. 3, 2003, which is incorporated herein by reference in its entirety.

As shown in FIG. 1, the system includes a data store 100, a client computer 110, a storage manager (or storage manager component) 120, an SM index 130, a jobs manager 140, an archive check manager 150, one or more media agents (or media management components) 160, an MA index 170, a copy manager 180, and one or more storage devices 190. The data store 100 contains data generated by a typical enterprise machine, such as client computer 110. For example, a data store 100 may contain ORACLE data for a database, or mail server data. In the event that a data store 100 loses data, the data store 100 obtains the lost data from a backup or other data copy. The data store 100 is generally in communication with the client computer 110

The client computer 110 may be a single client computer 110 or a plurality of client computers 110. Client computer 110 generally refers to a computer with data, e.g. a primary data set, which may be backed up, such as a personal computer, a workstation, a server computer, a host computer, etc. The client computer 110 typically also includes software to facilitate data transfers from the data store 100 to the other system components. The client computer 110 is generally in communication with the storage manager 120. In some embodiments of the invention, the client computer 110 is also in communication with the media agent 160.

The storage manager 120 is generally a software module or modules capable of coordinating and controlling a storage system. In preferred embodiments, the storage manager 120 contains an SM index 130, a jobs manager 140, and an archive check manager 150. In other embodiments of the invention, the SM index 130, jobs manager 140, or archive check manager 150 may exist independently within the storage system, or reside within different components of the storage system, such as the media agent 160. The storage manager 120 communicates directly the client computer 110 and media agent 160 to initiate, perform and manage system storage operations. Storage operations include, but are not limited to, creation, storage, retrieval, migration, deletion, and tracking of primary or production volume data, secondary volume data, primary copies, secondary copies, auxiliary copies, snapshot copies, backup copies, incremental copies, differential copies, HSM copies, archive copies, Information Lifecycle Management ("ILM") copies, and other types of copies and versions of electronic data. The storage manager 120 manages system storage operations, and together with the job manager 140 and archive check manager 150, manages and directs data verification, including, for example, updating the data verification information to SM index 130.

The storage manager 120 includes SM index 130, which is generally any storage index that is maintained to store index data for storage operations, such as data verification operations. Data stored to the SM index 130 in data verification operations includes for example, data copied or backed up, the metadata generated in association with data sets, the results of verification checks, and other information generated by the system during storage operations. The SM index 130 can also be a storage index known in the art, or other storage index, such as, the index cache of CommVault's GALAXY as further described in U.S. patent application Ser. No. 10/260,209, now U.S. Pat. No. 7,107,298, which is incorporated herein by reference in its entirety. The SM index 130 stores data related to the storage system components, including information related to each data set, copies, backups, metadata, or other information. Index data is useful because, among other benefits, it provides the system with an efficient mechanism for locating information associated with performing storage operations.

The storage manager 120 also includes the jobs manager 140, which is a module (or modules) that schedules and monitors storage operations that are to be performed, are being performed, or have been completed by the system. The jobs manager 140 can schedule storage operations automatically, for example, based on storage policies. Storage operations can also be scheduled manually, for example, a user may enter an input to the jobs manager 140, using, for example, a user interface to schedule a storage operation. The jobs manager 140 directs the archive check manager 150 to initiate data verification operations, as further described herein. The jobs manager 140 is preferably included in the storage manager 120, but may exist independently in the system, or within another system component, such as media agent 160.

A storage policy is generally a data structure or other information which includes a set of preferences and other storage criteria for performing a storage operation. The preferences and storage criteria may include, but are not limited to: a storage location, relationships between system components, network pathway to utilize, retention policies, data characteristics, compression or encryption requirements, preferred system components to utilize in a storage operation, and other criteria relating to a storage operation. A storage policy may be stored to a storage manager index, to archive media as metadata for use in restore operations or other storage operations, or to other locations or components of the system.

The archive check manager 150 is also included in the storage manager 120, and is a module (or modules) that manages data verification operations within the system, as further described herein. For example, the archive check manager 150 identifies data to be verified in the data verification operation and manages the data verification operation. The archive check manager 150 is preferably included in the storage manager 120, but may exist independently in the system, or within another system component, such as media agent 160.

The media agent 160 is generally a module or modules capable of managing storage operations, such as copying and backups, or other storage-related operation. The media agent 160 preferably includes MA index 170 and copy manager 180. The media agent 160 is in communication with the storage manager 120 and storage device 190, for example, via a local connection or a network. In some embodiments of the invention, the media agent 160 is also in communication with the client computer 110. The media agent 160 is capable of communicating instructions from a storage manager 120 to a storage device 190 to undertake a storage operation.

Additionally, the media agent 160 is capable of directing the copy manager 180, which is responsible for initiating and performing a copy operation. The media agent 160 stores data related to storage operations and media, such as auxiliary copies, to MA index 170. Examples of data stored by the media agent 160 to the MA index 170 include metadata or other data associated with storage operations.

The MA index 170 may be an index, such as SM index 130 described herein, the media agent index described in U.S. Provisional Patent Application No. 60/460,234, titled SYSTEM AND METHOD FOR PERFORMING STORAGE OPERATIONS IN A COMPUTER NETWORK, filed Apr. 3, 2003, or other storage index known in the art. The copy manager 180 is a module or modules used to initiate, manage and perform copy operations or other copy operations. A copy operation is a storage operation that generally includes creating a duplicate copy of data for storage. Copies are typically made for disaster recovery purposes.

The copy manager 180 preferably resides within the media agent 160, but can also exist as an independent system component, or within another system component.

The storage device 190 is generally one or more devices as described herein. The storage device 190 can be a CommVault GALAXY storage device, or other storage device capable of performing a storage operation. Storage device 190 typically includes components such as media, slots, media drives and a robotic arm or arms.

Data generated by the system or otherwise obtained by the system, is typically received by data store 100, or client computer 110. A copy of the data, for example, an auxiliary copy or other copy, is made according to storage policies, as further described herein. When data is copied, the copy is generally transferred to the storage device 190 via the storage manager 120 or media agent 160. The data copy is checked to verify that the contents of the copy are identical to the original data.

Figure 2:
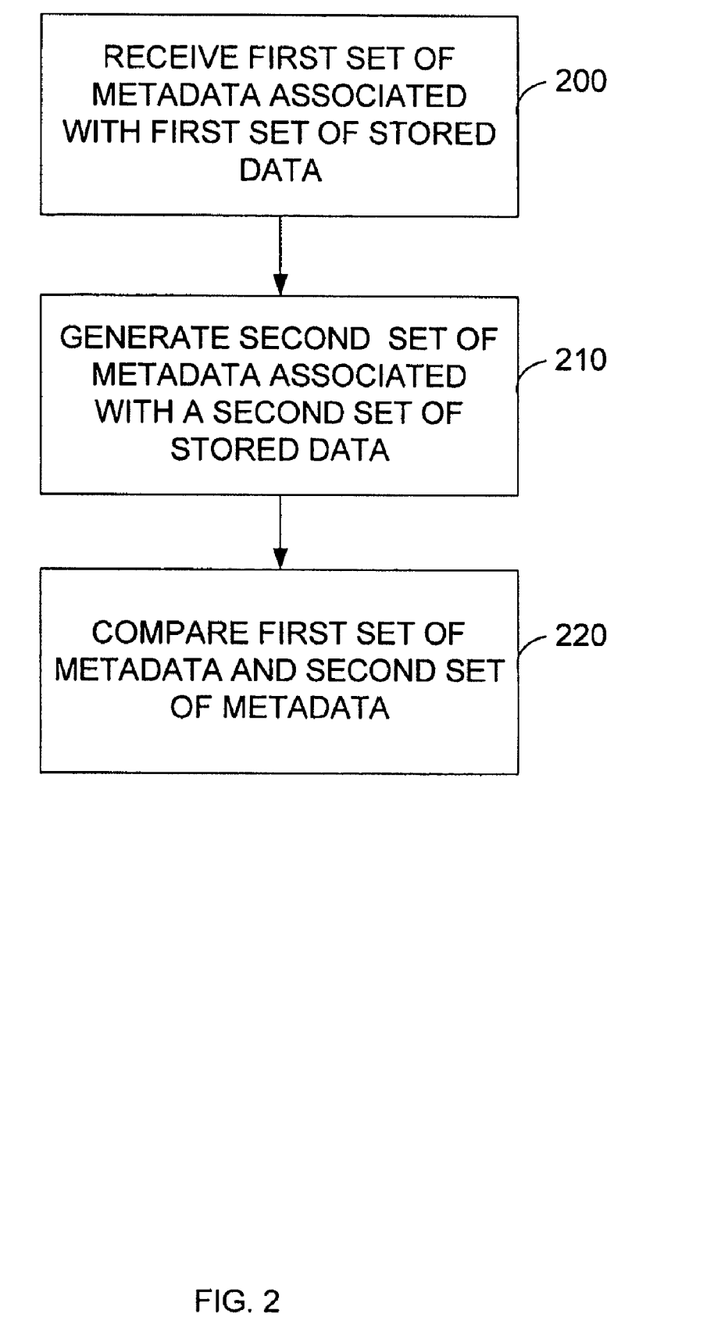
FIG. 2 is a flow diagram for verifying stored data according an embodiment of the invention.

Referring to FIG. 2, which depicts a flow chart of a method of an embodiment of the invention for verifying data, a first set of metadata associated with a first set of stored data is received, step 200. Generally, when a copy of the original or first set of data is created, a set of metadata related to the first set of data is created. In preferred embodiments, the metadata is generated by the copy manager, or other system component, and is received by a media agent, copy manager or other system component. The first set of metadata is associated with a first set of stored data, for example, the first set of metadata is generated based on the first set of stored data. In preferred embodiments, the first set of stored data is an original set of data, primary copy, other original data copy or verified copy. The first set of metadata is preferably associated with the first set of stored data according to a procedure known to the storage system. For example, the first set of metadata can be generated according to a routine based on the first set of stored data, obtained using variables based on the first set of stored data, generated as a chunk header, as further described herein, or other procedure for obtaining metadata based on the first set of stored data, or other data. In preferred embodiments, the first set of metadata is stored to an index, such as the SM index or MA index.

A second set of metadata associated with a second set of stored data is generated, step 210. In preferred embodiments, the second set of stored data is associated with the first set of stored data. For example, the second set of stored data is typically a backup, auxiliary copy or other copy of the first set of stored data. The second set of metadata is generated based on the second set of stored data. Preferably, the procedure for generating the second set of metadata is the same procedure used to generate the first set of metadata. In one embodiment of the invention, the second set of metadata is generated by a copy manager, a media agent, or other system component. In some embodiments, the second set of metadata is generated in a partial copy operation, wherein, a set of data is read, metadata based on the set of data is generated, but no copy of the data file is made. In another embodiment of the invention, the second set of metadata is generated by the archive check manager. In preferred embodiments, the second set of metadata is stored to an index, such as the SM index or MA index.

The first set of metadata and the second set of metadata are compared, step 220. The first set of metadata and the second set of metadata are compared to determine whether the sets of metadata are similar, equivalent, or otherwise indicate that the underlying data which generated the metadata are substantially similar. If the comparison of the first set of metadata and the second set of metadata indicates that the sets of metadata are similar, the underlying data used to generate the first and second sets of metadata, in this case, the first and second sets of stored data, are substantially similar. Thus, the second set of stored data is determined to be an accurate or true copy of the first set of stored data. When the first set of metadata and the second set of metadata are determined to be different or inconsistent, or otherwise indicate that the underlying data used to generate the first and second sets of metadata are different, the first and second sets of stored data may not be equivalent, and therefore, the second set of stored data is likely an inaccurate or otherwise defective copy of the first set of stored data.

In preferred embodiments, a copy manager compares the first set of metadata and the second set of metadata. In another embodiment, an archive check manager compares the first set of metadata and the second set of metadata. The first set of metadata and the second set of metadata are compared to determine whether the sets of metadata are the same. In some embodiments, one or both of the sets of metadata are obtained from an index, such as the MA index, SM index, or are generated as needed, for example, by performing a partial storage operation, further described herein, or other method for obtaining metadata.

Figure 3:
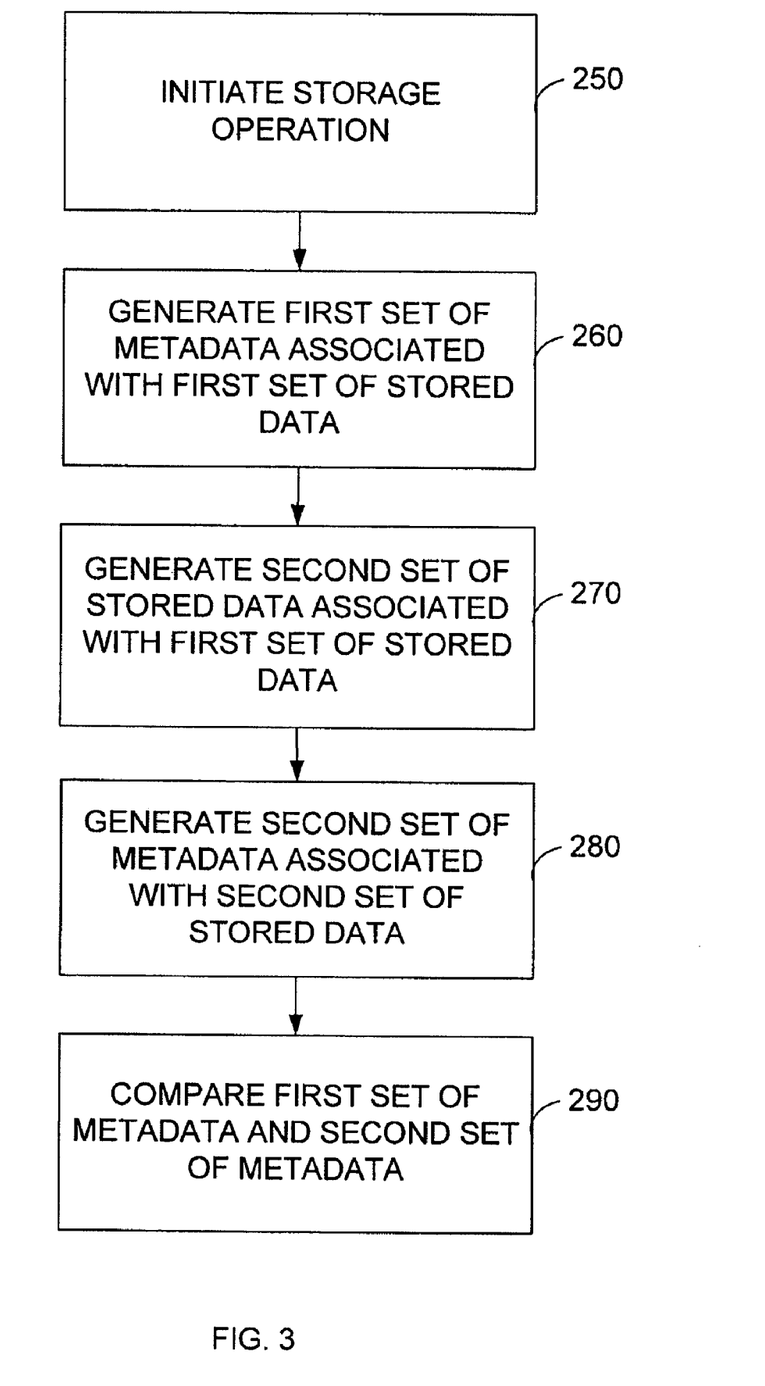
FIG. 3 is a flow diagram for verifying stored data according to an embodiment of the invention.

Referring to FIG. 3, which depicts a flowchart of another embodiment of the invention, a storage operation is initiated, step 250. The storage operation is normally initiated by a storage manager, for example, by a jobs manager, which, as described herein, schedules storage operations, for example, based on storage policies. In other embodiments, other system components initiate system storage operations. The jobs manager, or other system component, schedules storage operations and directs an archive check manager, or other system component, to initiate a storage operation. The storage operation initiated at step 250 is preferably an operation similar to a copy operation. For example, a data file in a client data store is copied. A copy manager, or other system component, generates a first set of metadata associated with a first set of stored data, step 260. For example, the copy manager initiates a copy operation, and obtains the first set of stored data. The copy manager reads the first set of stored data and generates a first set of metadata. As described herein, the first set of metadata is generated according to a procedure, known to the system, such as according to a routine based on the first set of stored data, or obtained using a variable based on the first set of stored data, generated as a chunk header, or other procedure for obtaining metadata. The first set of stored data is generally an original set of data, such as a primary copy, other original copy or verified copy.

The copy manager or other system component generates a second set of stored data associated with first set of stored data, step 270. Preferably, the second set of stored data is a backup, auxiliary copy, or other copy of the first set of stored data. The second set of stored data is generally obtained by directing the copy manager to read the first set of stored data and write a copy, such as the second set of stored data, but may also be generated using other copy methods and system components. The copy manager, or other system component, generates a second set of metadata associated with the second set of stored data, step 280. Specifically, the second set of metadata is generated based on the second set of stored data. The second set of metadata is preferably obtained using the same procedure used to generate the first set of metadata in step 260, or other procedure for generating metadata, for example, generating metadata based on data from a primary copy. The copy manager or other system component, compares the first set of metadata and the second set of metadata, step 290. The first set of metadata and the second set of metadata are compared to determine whether the first set of metadata and the second set of metadata are equivalent. As described herein, the comparison of the first and second sets of metadata may be used as an indicator of whether the second set of stored data is an accurate copy of the first set of stored data.

When data is copied, for example, when the media agent or copy manager copies a first set of stored data and creates a second set of stored data, the data is generally copied and transferred between system components using chunks, such as the system and methods described in U.S. Pat. No. 6,418,478, titled PIPELINED HIGH SPEED DATA TRANSFER MECHANISM, issued Jul. 9, 2002. Chunks are useful because they can be used to assemble data into packages that are transmitted across system networks, for example according to system resource availability.

Figure 4:
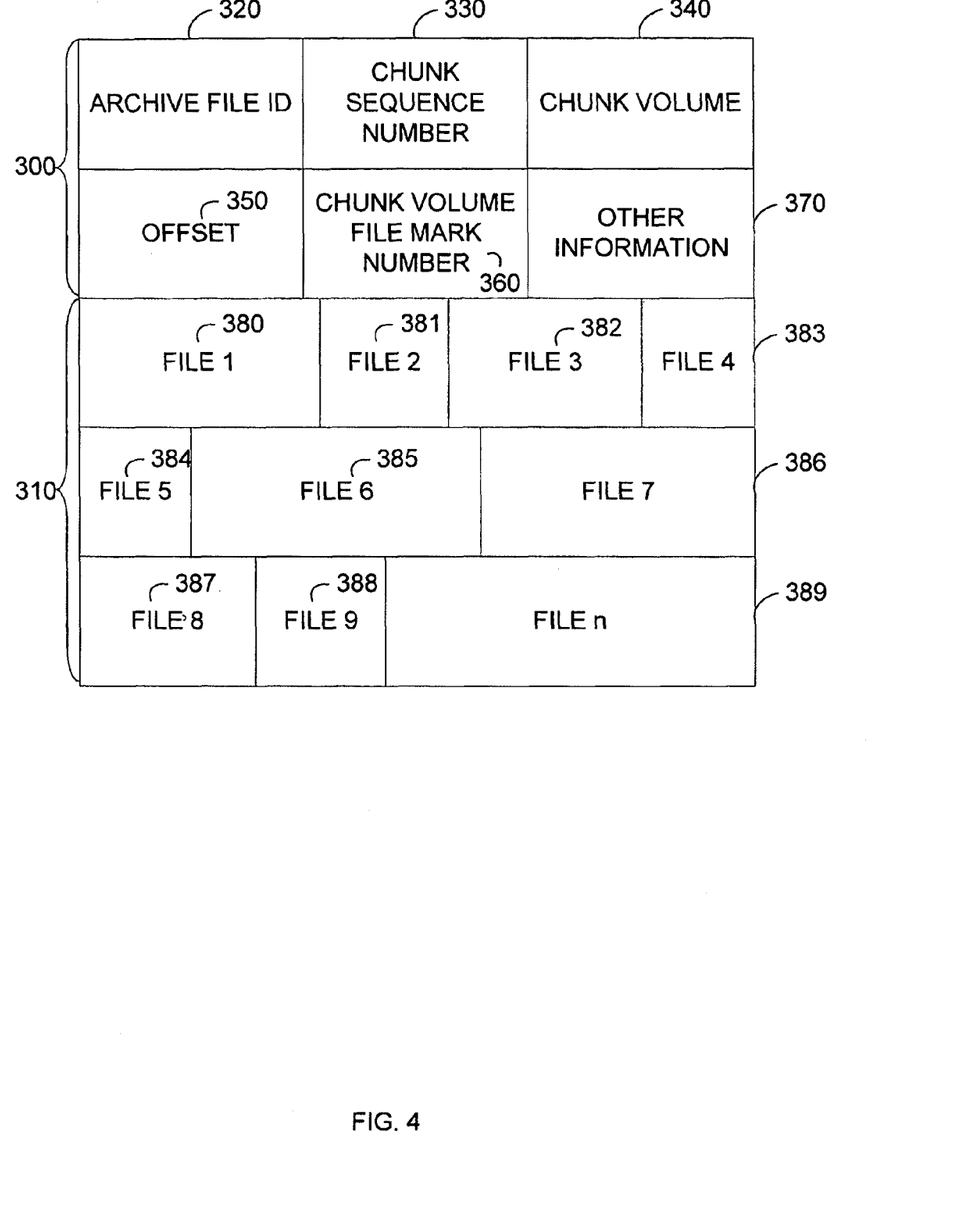
FIG. 4 is a block diagram showing a chunk, according to an embodiment of the invention.

Referring to FIG. 4, which depicts a chunk according to an embodiment of the invention, chunks are generally a fixed file size, such as 512 MB, and include a chunk header 300 and a chunk payload 310. The chunk header 300 includes data or information such as an archive file ID 320, a chunk sequence number 330, a chunk volume 340, an offset 350, a chunk volume file mark number 360, and other information 370. A chunk payload 310 includes data files or a subset of data files that were copied, e.g. an initial or first set of data. Each of the data items or information included in the chunk header 300 is related to the file data 380-389 in the chunk payload 310. The chunk header 300 data items include metadata generally derived from the stored data or files in the chunk payload 310. For example, a copy manager or other system component which creates, packages, or otherwise handles chunks, reads the data contained in the chunk payload 310 to generate metadata or other information in the chunk header 300.

The archive file ID 320 is an alphanumeric identifier for the file being archived, for example, in the payload 310. The chunk sequence number 330 provides the sequence information for the chunk. The chunk volume 340 indicates the volume of the chunk utilized, for example, the volume of the data or files on the chunk. Offset 350 indicates the distance the data item is offset, for example, which is information related to, and used in reassembling the chunk files. Chunk volume file mark number 360 refers to information related to the volume of the file. The chunk header 300 also contains other information 370, which may be data, variables, information or other metadata related to files 380-389 in the payload 310. Files 380-389 of the payload represent that a subset of a data file, a set of data, a file or a block, or several sets of data, files or blocks may be stored in a chunk payload, for example, file 1 to file n. The information contained in the chunk header 300 is preferably stored to an index, such as an MA index or SM index. Storing the information in the chunk header 300 to the index is useful so that the information can be readily accessed by a media agent, storage manager, copy manager or other system component.

Figure 5:
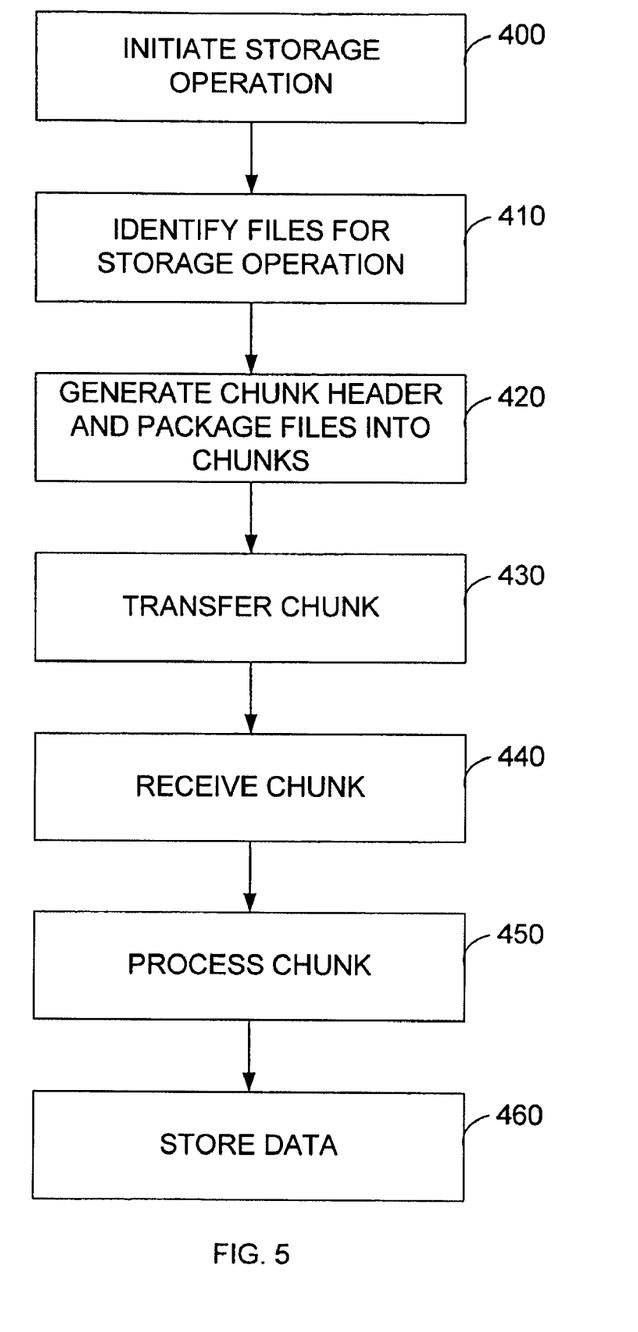
FIG. 5 is a flow diagram for a storage operation according to an embodiment of the invention.

Referring to FIG. 5, which depicts a flow diagram of a storage operation, a storage operation is initiated, step 400. Preferably the storage operation is initiated by a storage manager, or storage manager components, such as a jobs manager, an archive check manager, a media agent, or media agent components, such as a copy manager or other system component. The storage operations initiated at step 400 include, for example, system backups, media movement, imports, exports, migrations, restores, data verification and other storage-related operations. Files are identified for the storage operation, step 410. The files are identified by the media agent, storage manager, archive check manager, copy manager, or other system component. In some embodiments, the files may be identified according to storage policies associated with a particular file. As further described herein, information related to files and storage policies are stored in, and may be obtained from an index, such as an SM index or MA index, or other locations within the system.

In general, the storage operation is assigned to a particular media agent to manage the operation. The media agent is typically associated with the file, storage device, or other system component utilized in the storage operation. Additionally, the media agent may be designated to manage the operation by storage policies. In some embodiments, the media agent may be dynamically reassigned during a storage operation according to storage policies, system resource availability or other variable. The copy manager used in storage operations is typically the copy manager associated with the media agent assigned to manage the operation. It is understood that the copy manager may be dynamically reassigned during the storage operation, for example, when its media agent is reassigned, or according to system resource availability or other variables.

A chunk header is generated for the files identified in step 410, and the files are packaged into chunks, step 420. The chunk header is generated according to a procedure known to the system, such as the procedure described herein in connection with generating metadata. For example, the chunk header is generated according to specific terms or variables based on the files, such as the data or information items included in the chunk header. Preferably, the copy manager creates the chunk header. The files are packaged into chunks, for example, into a payload. The chunk header information is updated to an index, such as an SM index or MA index.

The chunk is transferred, step 430, for example, via the networks using, or as directed by, a media agent, or other system component. In general, the chunk is transferred through the networks according to system resource availability. The chunk transfer destination is preferably a storage device assigned, for example, according to storage policies, or as directed by media agent, storage manager, or other system component.

The chunk is received, step 440 at the storage device, mentioned herein. The storage device preferably communicates data indicating that the chunk has been received to the media agent, storage manager or other system component. The chunk receipt data is updated to an index, such as the SM index or MA index. Upon receipt of the chunk, the chunk is processed, step 450. The chunk is generally processed by sequence number, or other information that is contained in the chunk header to reassemble the files. In preferred embodiments, the copy manager reads the chunk header and stores the data contained in the chunk header to an index, such as the SM index or MA index. In some embodiments, the data or files contained in the chunk payload are extracted from the chunk according to the chunk header information. The copy manager copies the chunk file information, for example, to storage media, such as disks, tapes, CD-ROMs or other media for storage. The data extracted from the chunk is stored, step 460. The data is generally stored to a storage device.

Figure 6:
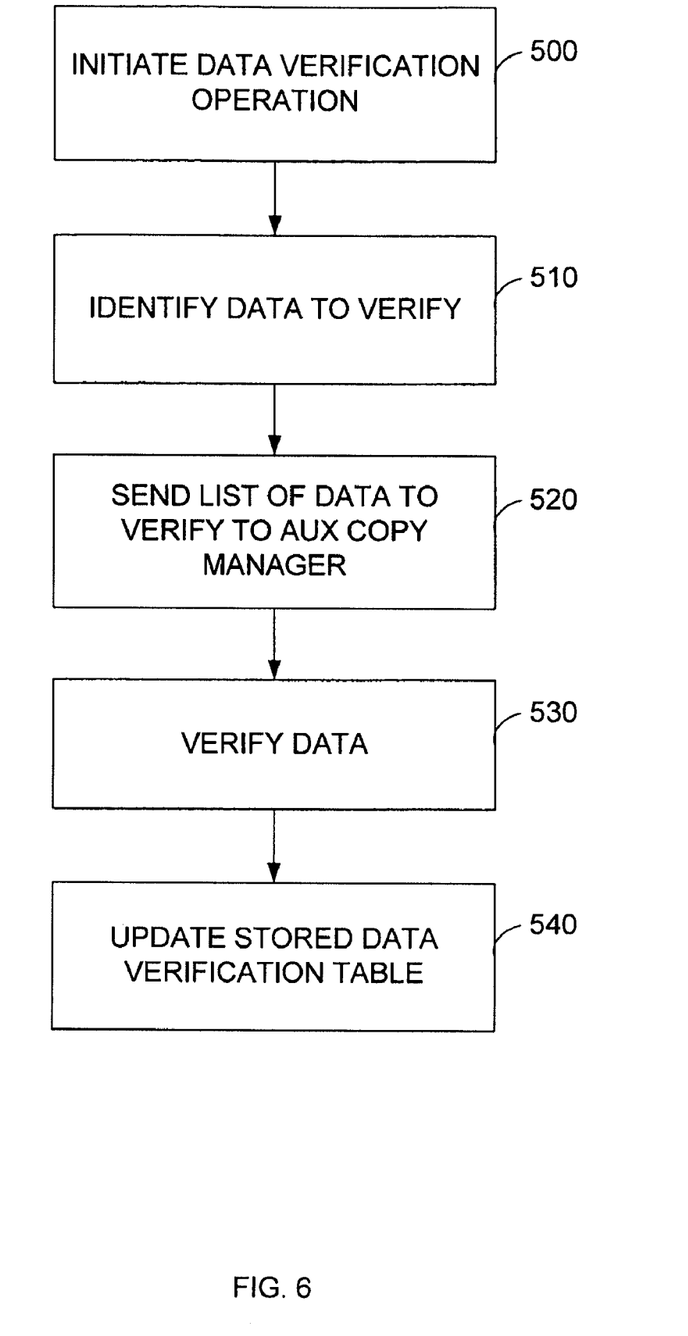
FIG. 6 is a flow diagram for verifying stored data, according to an embodiment of the invention.

Referring to FIG. 6, which depicts a flow chart for verifying stored data according to one possible embodiment of the invention, a data verification operation is initiated, step 500. In preferred embodiments the data verification operation is scheduled by the jobs manager according to storage policies, and the job manager directs the archive check manager to initiate a data verification operation. In other embodiments, the data verification operation is initiated by the storage manager, media agent, or other system component. The data verification operation, as described herein, determines and verifies whether a copy of data is an accurate copy of an original data set.

Data to be verified in the data verification operation is identified, step 510. In preferred embodiments, the data to be verified is identified, for example, by referencing a stored data verification table, such as the stored data verification table 600 depicted in FIG. 7. In other embodiments, the data to be verified is identified according to information contained in an index, such as an SM index, an MA index, storage policy, or other system component, or as directed by a user. Preferably, the archive check manager identifies the data to be verified by referring to the stored data verification table 600, the index, such as the SM index or MA index, or other data source. In other embodiments of the invention, the storage manager, jobs manager, media agent, copy manager or other system component identifies the data to be verified. In some embodiments, the stored data verification table 600 data may be stored, for example to the SM index or MA index.

Figure 7:
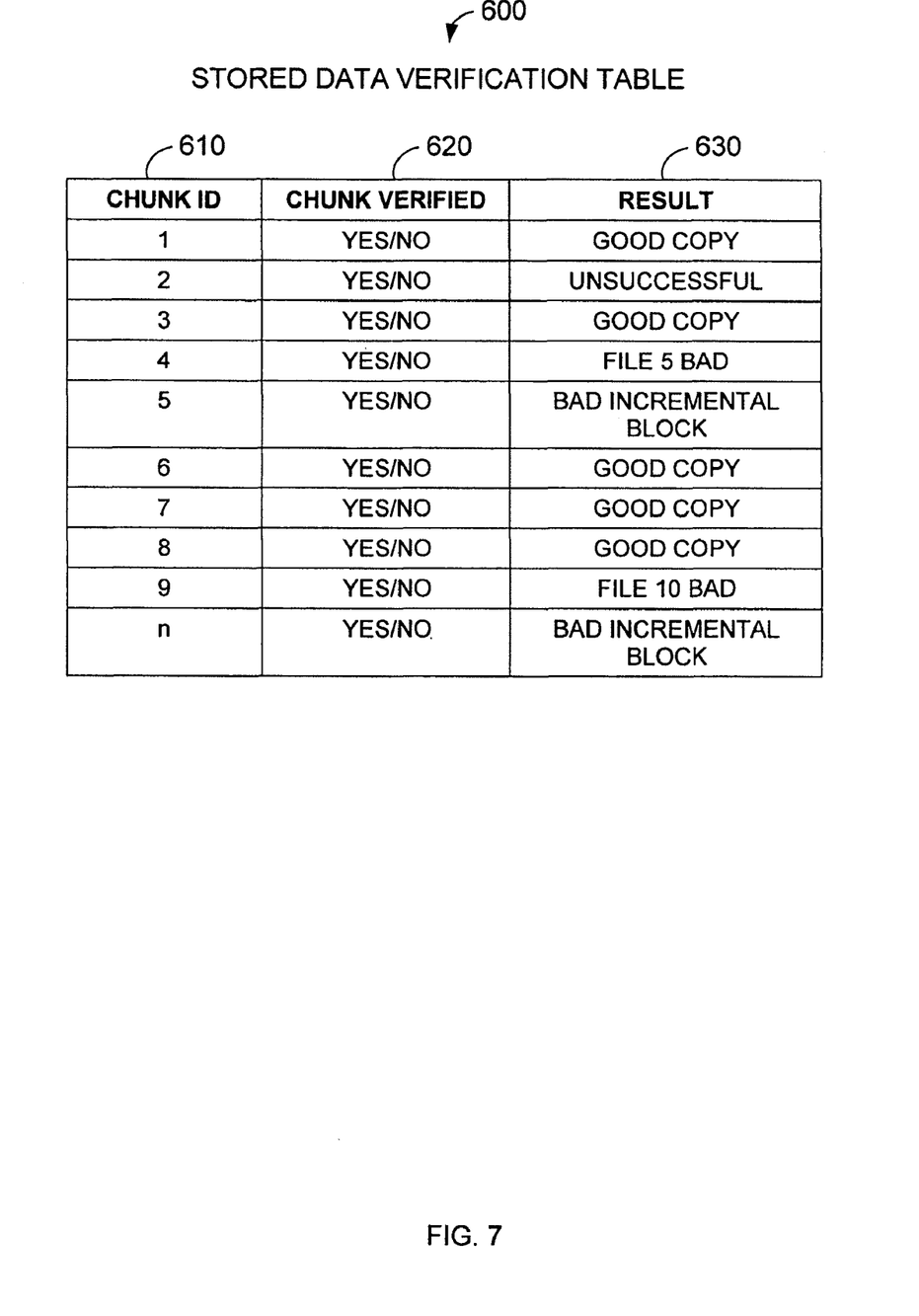
FIG. 7 is a block diagram showing a stored data verification table according to an embodiment of the invention.

Referring to FIG. 7, the data verification table 600 includes data such as the data shown in a column titled chunk ID 610, a column titled chunk verified 620, a column titled result 630, or other information. Chunk ID 610 is an alphanumeric identifier for the file, block, chunk or data set stored, such as the files, blocks, chunks, or data sets stored to chunk payload. Chunk verified 620 provides a yes or no flag indicating whether the chunk or data has been verified, for example, in a data verification operation, as described herein. Result 630 indicates the result of the data verification operation, such as good copy, unsuccessful, bad file, bad incremental block, or other result. In addition to verifying whether the data is accurate, the data verification operation identifies with particularity which part of the file or copied data is not a good copy, such as the result in column result 630 which indicates that file 5 is bad.

Referring again to FIG. 6, as mentioned herein, in general, the jobs manager schedules data verification operations and other storage operations, and directs the archive check manager to identify data to be verified. In some embodiments, the archive check manager refers to an index, such as an MA index to identify data to be verified. In other embodiments, the archive check manager identifies the data to be verified in step 510 by referring to the stored data verification table. In some embodiments, the archive check manager refers to the stored data verification table by chunk identifier to determine whether the chunk has been verified, for example, according to the data contained in a chunk verified column. In other embodiments, the archive check manager refers to the stored data verification table by data contained in the chunk verified column to determine which chunks have not been verified, and obtaining the chunk identifier for unverified chunks.

The archive check manager obtains the list of data for verifying, as described herein, and sends it to the copy manager, or other system component, step 520. The list of data for verifying can be sent, for example as data stored to an index, such as an SM index or MA index, or in a communication to the copy manager. Generally, upon receipt of the list of data to be verified, the copy manager verifies the data, step 530.

Figure 8:
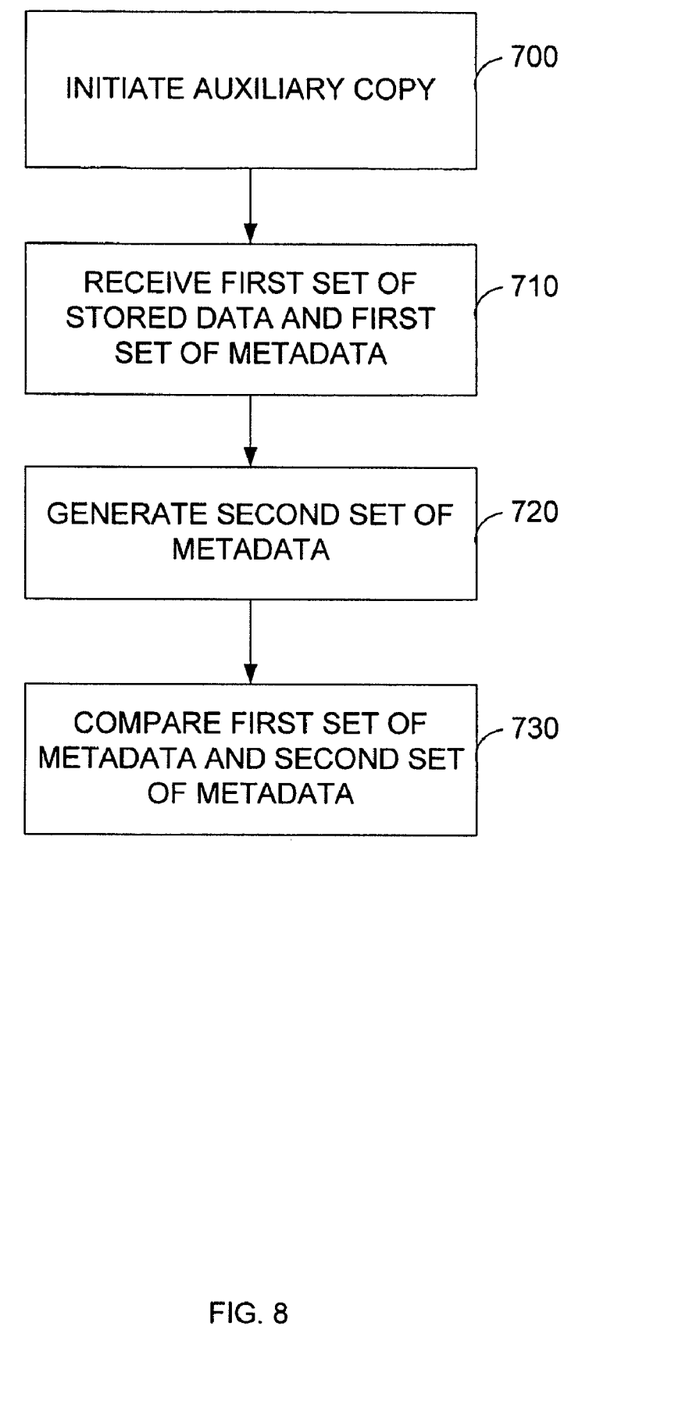
FIG. 8 is a detailed flow diagram of a step of the flow diagram of FIG. 6 for verifying stored data, according to an embodiment of the invention.

An embodiment of step 530 is depicted in the detailed flowchart of FIG. 8. The copy manager, or other system component, initiates a copy operation, step 700. The copy manager receives a first set of stored data, or a primary copy, or other original copy of data, and a first set of metadata, step 710. The first set of stored data is typically stored to a storage device and information associated with the first set of stored data, such as the first set of metadata, is stored to an index, or other system component. The index, or other system component, provides the source of the first set of stored data and the first set of metadata received by the copy manager. In another embodiment, the copy manager, or other system component, generates the first set of metadata, as described herein, for the first set of stored data. In preferred embodiments, the copy manager performs a copy read operation, wherein, the first set of stored data is read, and a set of metadata is generated. The first set of metadata is stored to an index, or other system component.

The copy manager, or other system component, generates a second set of metadata, step 720. In preferred embodiments, the copy manager reads a copy of the first set of stored data, such as an auxiliary copy, or other copy and performs a partial storage operation. The partial storage operation is generally a copy operation, such as a copy operation used to create a copy of the first set of stored data, auxiliary copy or other copy. The partial storage operation includes reading the data file, creating metadata associated with the data file, but does not complete the copy operation. Thus, only metadata is generated in the partial storage operation. In preferred embodiments, the procedure for generating the metadata in the partial storage operation is the same as the procedure used to generate the first set of metadata, and the first and second sets of metadata are preferably chunk headers, such as chunk header 300. A copy of the second set of metadata can be stored for later reference to an index, or used immediately in a comparison of the first set of metadata and second set of metadata, step 730.

Referring back to FIG. 6, the result of the data comparison, for example, the comparison of the first set of metadata is updated to the stored data verification table, step 540. If the first and second sets of metadata are the same, the copy manager updates the stored data verification table to reflect the result to indicate the second set of stored data is a good copy. Alternatively, if the first and second sets of metadata are different, the copy manager can determine which of the files, for example, which of the files in the chunk, are inconsistent, and update the results data accordingly, for example, the data included in the column results 630 of FIG. 7, such as file 5 is bad, bad incremental block, the verification was unsuccessful, or other result. In preferred embodiments, when the data verification result is something other than good copy, the copy manager initiates another copy or backup operation to copy or back up the first set of stored data.

Systems and methods disclosed herein are used generally to check or verify all data in a storage system. In some embodiment, the systems and methods can be applied selectively to portions of data. For example, in some embodiments, data within the system can be arbitrarily grouped into backup sets or in CommVault system backup sets, generally denoting arbitrary groups of data wherein data in one backup set can also be in another backup set, such that it is not exclusively in one backup set. At the sub-client level, data in one sub-client group is not in another sub-client group and is exclusive to a sub-client. As described herein, backup sets may have several sub-clients in a set, at the application level, or as specified in a storage policy for a group of data.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for verifying data copies in a storage management system, the method comprising:
   performing a first storage operation on a first set of data in a first location to generate a plurality of data chunks, wherein said performing the first storage operation for at least one of the plurality of data chunks further comprises:
      generating a second set of data associated with the first set of data,
      generating a first set of metadata associated with the first set of data, and
      storing the second set of data and the first set of metadata on a storage device;
   storing a copy of the first set of metadata in an index remote to the storage device;
   generating a second set of metadata associated with the second set of data stored on the storage device;
   comparing the first set of metadata in the index with the second set of metadata to verify whether or not differences exist between the first and second sets of data without accessing the first and second sets of data;
   performing a second storage operation on the second set of data, the second storage operation comprising:
      generating a third set of data associated with the second set of data,
      generating a third set of metadata comprising information for retrieving the third set of data, and
      storing the third set of data in a second location; and
   comparing the first set of metadata in the index with the third set of metadata to verify whether or not differences exist between the first and third sets of data.

2. The method of claim 1, wherein the first and second storage operations comprise a same copy operation.

3. The method of claim 1, further comprising backing up the first set of data when said comparing the first and second sets of metadata indicates that the first and second sets of data are not equivalent.

4. The method of claim 1, additionally comprising updating, after said comparing, an entry in a verification table to identify that the second set of data has been verified.

5. The method of claim 4, additionally comprising updating, based on said comparing, the verification table to indicate whether or not the second set of data is inconsistent with the first set of data.

6. The method of claim 1, wherein the second storage operation comprises an archive operation.

7. The method of claim 1, wherein the first set of data comprises a plurality of files.

8. The method of claim 1, wherein the first set of metadata comprises information usable to extract the second set of data from the plurality of data chunks.

9. The method of claim 1, wherein generating the second set of metadata further comprises performing a partial storage operation on the second set of data such that the second set of metadata is generated without generating a copy of the second set of data.

10. A system for verifying data stored in a computer network environment, the system comprising:
   a first media agent configured to manage storage-related operations;
   a copy manager of the first media agent configured to perform a first storage operation on a first set of data by generating at least one data chunk, the at least one data chunk comprising (i) a payload portion including a second set of data associated with the first set of data and (ii) a header portion including a first set of metadata, the copy manager being further configured to generate the first set of metadata as a result of the first storage operation;
   an index maintained by the first media agent and configured to store a copy of the first set of metadata;
   at least one storage device in communication with the first media agent and configured to receive the at least one data chunk from the first media agent, process the at least one data chunk and store the second set of data and the first set of metadata;

a storage manager configured to generate a second set of metadata associated with the second set of data stored on the at least one storage device;

an archive check module configured to compare the first set of metadata stored in the index with the second set of metadata to verify whether or not differences exist between the first and second sets of data;

a verification data structure in communication with the archive check module, the verification data structure configured to identify whether or not the second set of data has been verified; and a second media agent configured to perform a second storage operation on the second set of data by generating a third set of data and a third set of metadata associated with the second set of data, and wherein the archive check module is configured to compare the first set of metadata stored in the index with the third set of metadata to verify whether or not differences exist between the first and third sets of data.

11. The system of claim 10, wherein the first media agent further comprises the index configured to store the copy of the first set of metadata.

12. The system of claim 10, wherein the storage manager further comprises the index configured to store the copy of the first set of metadata.

13. The system of claim 10, wherein the verification data structure identifies the differences that exist in the second set of data.

14. The system of claim 10, wherein the storage manager comprises the archive check module, and wherein the archive check module is configured to generate the second set of metadata.

15. The system of claim 10, wherein the storage manager further comprises a jobs manager configured to direct performance of the first and second storage operations.

16. The system of claim 10, wherein the storage manager is configured to generate the second set of data by performing a partial storage operation on the second set of data such that the second set of metadata is generated without generating a copy of the second set of data.

17. The system of claim 10, wherein the first set of metadata comprises data recovery metadata usable to retrieve the second set of data from the at least one data chunk.

* * * * *